Patented July 9, 1935

2,007,322

UNITED STATES PATENT OFFICE 2,007,322

PREPARATION OF ALIPHATIC CHLORIDES

Hans Aickelin, Summit, N. J., assignor to General Aniline Works, Inc., New York, N. Y., a corporation of Delaware No Drawing. Application March 3, 1932, Serial No. 596,674. In Germany March 4, 1931

6 Claims. (Cl. 260—162)

The present invention relates to the production of aliphatic chlorides, to a process of preparing them.

I have found that aliphatic chlorides may be prepared by introducing compressed or liquefied anhydrous hydrochloric acid into hydroxy compounds which are to be converted into the corresponding chlorides. More particularly my invention relates to the production of lower aliphatic chlorides, by introducing compressed or liquefied anhydrous hydrochloric acid into alcohols which are to be converted into the corresponding chlorides.

I prefer to carry out my process in the following manner:

The compressed or liquefied anhydrous hydrochloric acid is rapidly introduced into the hydroxy compounds if a high temperature is desirable to carry out the process, or is introduced slowly into the hydroxy compounds if a high temperature is not necessary and a high hydrochloric acid concentration is desirable to carry out the process. The hydroxy compounds are contained in a pressure tight suitable vessel, such as, for instance, enameled iron or acid-proof stoneware vessels. In the course of the process no external heat should be applied, because the heat of solution which is produced by the introduction of the condensed or liquid hydrochloric acid into the hydroxy compounds is sufficient to convert the hydroxy compounds into the corresponding chlorides. In cases where the heat of the solution produced by the introduction of the compressed or liquefied anhydrous hydrochloric acid into the hydroxy compound is not sufficient to promote the reaction, the hydroxy compound may be heated before it is brought into reaction with the compressed or liquefied anhydrous hydrochloric acid. In cases where the reaction is to be carried out at a high temperature, the vessel must be well insulated to avoid a loss of heat. However, if a high concentration of hydrochloric acid but no high temperature is necessary, no insulation of the vessel is necessary to avoid losses of the heat.

The following example will further illustrate the nature of my invention, but the same is not restricted thereto, all parts being by weight:

Example:—324 kilos liquid hydrochloric acid are pressed for 1–3 hours into 380 kilos of alcohol of 94% strength, which are contained in an acid and pressure-tight autoclave which is lined with stoneware. The reaction which takes place is very violent. The mixture becomes heated to about 140° C. and the pressure rises to 30 atmospheres. A large part of the ethyl chloride formed may be distilled off by using the heat of the reaction mixture, while the residue together with the formed hydrochloric acid of 20% strength is drawn off from the reaction vessel. The yield of ethyl chloride is practically quantitative.

I claim:

1. Process for the production of ethyl chloride which comprises acting upon one molecular proportion of ethyl alcohol of about 94% strength with from 1 to 1.2 molecular proportions of anhydrous liquefied hydrogen chloride in a pressure tight vessel.

2. Process for the production of aliphatic chlorides which comprises acting in a pressure tight vessel upon an aliphatic alcohol with anhydrous hydrogen chloride in a state of liquefaction or in a state of compression at least as high as the vapor pressure of the reaction mixture induced by the heat of dissolution of the hydrogen chloride and of reaction.

3. The process as defined in claim 2 wherein the aliphatic alcohol and the hydrogen chloride are employed in equivalent amounts.

4. The process as defined in claim 2 wherein the aliphatic alcohol is ethyl alcohol.

5. Process for the production of ethyl chloride which comprises acting in a pressure tight vessel upon ethyl alcohol with about the equivalent amount of anhydrous hydrogen chloride in a state of liquefaction or in a state of compression at least as high as the vapor pressure of the reaction mixture induced by the heat of dissolution of the hydrogen chloride and of reaction.

6. Process for the production of aliphatic chlorides which comprises acting in a pressure tight vessel upon an aliphatic alcohol with anhydrous hydrogen chloride in a liquefied state.

HANS AICKELIN.